United States Patent [19]

Straub et al.

[11] Patent Number: 4,938,524

[45] Date of Patent: Jul. 3, 1990

[54] SEMI-TRUCK TRAILER GOOSENECK AND CURTAIN SIDE IMPROVEMENTS

[76] Inventors: Gerald J. Straub, 13133 Island Lake Rd.; Martin L. Straub, 13131 Island Lake Rd., both of Chelsea, Mich. 48118; David A. Logan, 403 Tatum; James D. Davis, Rte. 2, Box 535, both of Minden, La. 71055

[21] Appl. No.: 212,260

[22] Filed: Jun. 27, 1988

[51] Int. Cl.$^5$ .................... B62D 21/02; B62D 21/10; B62D 33/00
[52] U.S. Cl. ................................ 296/181; 296/182; 296/29; 296/204; 280/423.1; 280/789; 280/799
[58] Field of Search .................. 296/29, 138, 181-183, 296/202-205; 105/418; 280/789, 799, 423.1

[56] References Cited

U.S. PATENT DOCUMENTS

| 2,417,640 | 3/1947 | Fischbach | 280/423.1 |
|---|---|---|---|
| 3,439,822 | 4/1969 | Korodi | 296/182 |
| 3,598,421 | 8/1971 | Mason, Jr. | 280/789 X |
| 3,990,720 | 11/1976 | Schwartz | 296/182 X |
| 4,009,889 | 3/1977 | Smith | 280/423.1 |
| 4,050,709 | 9/1977 | LeBoeuf | 280/789 |
| 4,226,465 | 10/1980 | McCullough | 296/182 |
| 4,700,985 | 10/1987 | Whitehead | 296/181 |
| 4,828,316 | 5/1989 | Bennett et al. | 296/181 |

FOREIGN PATENT DOCUMENTS 2591966  6/1987  France ........................ 296/181

Primary Examiner—Dennis H. Pedder
Attorney, Agent, or Firm—James M. Deimen

[57] ABSTRACT

A semi-truck trailer gooseneck assembly comprises a single curved plate extending transversely between and beyond the twin parallel longitudinal girders to form a single lower flange. The curved plate extends from the assembly supporting the floor over the fifth wheel and connecting the king pin to the trailer. The rear portion of the curved plate extends to the horizontal flat lower flanges of the twin girders extending substantially the length of the trailer. The result is a structure of increased strength and moment of inertia permitting the web depth of the gooseneck to be substantially decreased.

The rear corner post comprises a two piece welded assembly wherein the major section is substantially an elongated "S" and the minor section "L" shaped. The shapes are welded together to form a hollow center portion and a pocket portion. The "L" section forms a contact for the rear door and the pocket engages the curtain to enable the curtain to be fully tightened when closed. The configuration permits the post to retain sufficient column strength with an overall thickness of only one inch.

17 Claims, 5 Drawing Sheets

SEMI-TRUCK TRAILER GOOSENECK AND CURTAIN-SIDE IMPROVEMENTS

BACKGROUND OF THE INVENTION

The field of the invention pertains to semi-truck trailers and, in particular, to curtain side trailers adapted to general cargo and palletized cargo.

Typical curtainside semi-truck trailers comprise a floor supported by a pair of longitudinal girders extending the full length of the trailer. The girders are commonly of I-section with the web depth varying in accordance with floor support requirements. At the forward end of the trailer, the king pin for the fifth wheel may be supported in a monocoque assembly. The monocoque assembly and I-section girders extending into the assembly are typically seven or more inches in depth. The minimum depth has been limited by the need for sufficient strength and moment of inertia in the girders to support the trailer floor and cargo. Attempts to reduce below seven inches the web depth of the I-section leading through the gooseneck into the monocoque over the fifth wheel have not been fully successful for full size semi-trailers because of excessive flexing and twisting under load.

Since the outside height of a semi-truck trailer is limited, each inch of clearance between the roof and floor is important to maximize cargo capacity. For a full size trailer about eighty cubic feet of cargo space can be gained for each inch of increased roof to floor distance.

The overall width of a semi-truck trailer is also limited, therefore the rear door opening is also limited by the necessary thickness of the rear corner posts of the trailer. In a rear door curtain side trailer the rear corner post column stability is solely dependent on the column itself because there is no adjoining sidewall or end wall to reinforce the column. Typically, the column is two inches or more in thickness and seven or more inches wide toward the front of the trailer.

SUMMARY OF THE INVENTION

The improvements disclosed below comprise means to increase the bulk capacity of a semi-trailer and the effective rear door opening width. The gooseneck improvement comprises replacement of the separate lower flanges of the twin parallel longitudinal girders of the trailer with a single curved plate that extends transversely across and beyond both webs of the girders. The substantial improvement in strength and moment of inertia for each girder and the combination over the curved portion of the gooseneck permits a substantial reduction in web height and plate thickness. The gooseneck thickness can be reduced to about five and ¼ inches from seven or more inches and the lower curved plate need only be about 5/16 inch steel for a full size general cargo and palletized cargo trailer. The curved plate better resists both tensile stresses and longitudinal torque applied to the trailer frame. The improvement is equally applicable to a level deck and drop deck trailer.

The rear corner post improvement comprises a two piece welded assembly wherein the major section is substantially an elongated "S" and the minor section is "L" shaped. The two rolled shapes are welded together to form a hollow center portion and a post pocket or cavity portion toward the front edge of the rear corner post. The "L" section forms a contact for the vertical door seals and the post pocket receives the curtain end to enable the curtain to be fully tightened when closed. The section shape retains sufficient column strength to permit hinge slots to be formed in the rearward edge of the post and the post to be made exceptionally thin. The posts need only be one inch in thickness and range from seven to ten inches in the forward direction. The curtain end includes a pocket that retains a vertical rigid bar adapted to loosely fit into the post pocket and tighten into the post pocket when the curtain is tightened longitudinally.

DESCRIPTION OF THE PREFERRED EMBODIMENT

Figure 1:
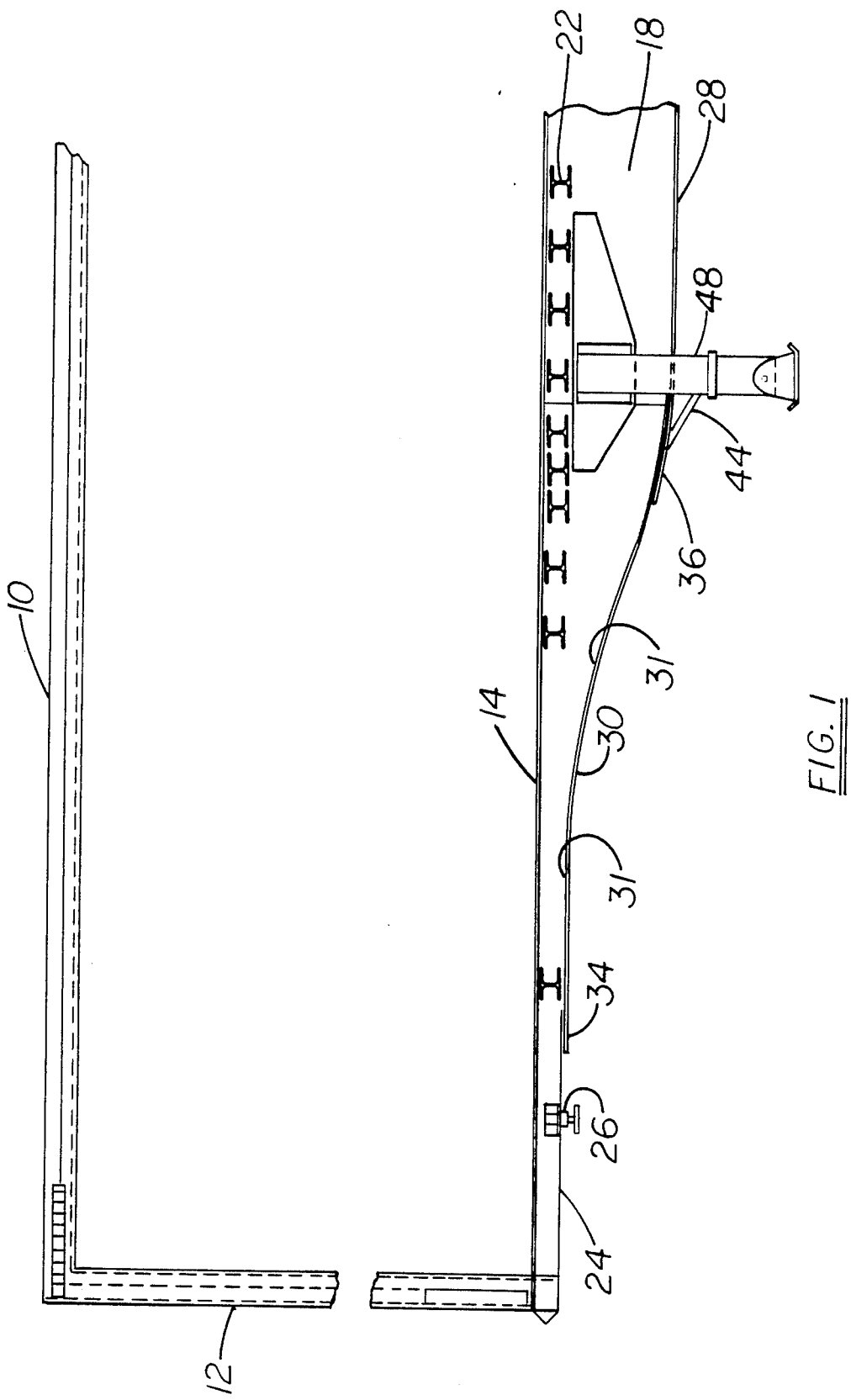
FIG. 1 is a schematic partial cutaway side view of the forward portion of a semi-truck trailer.
Figure 2:
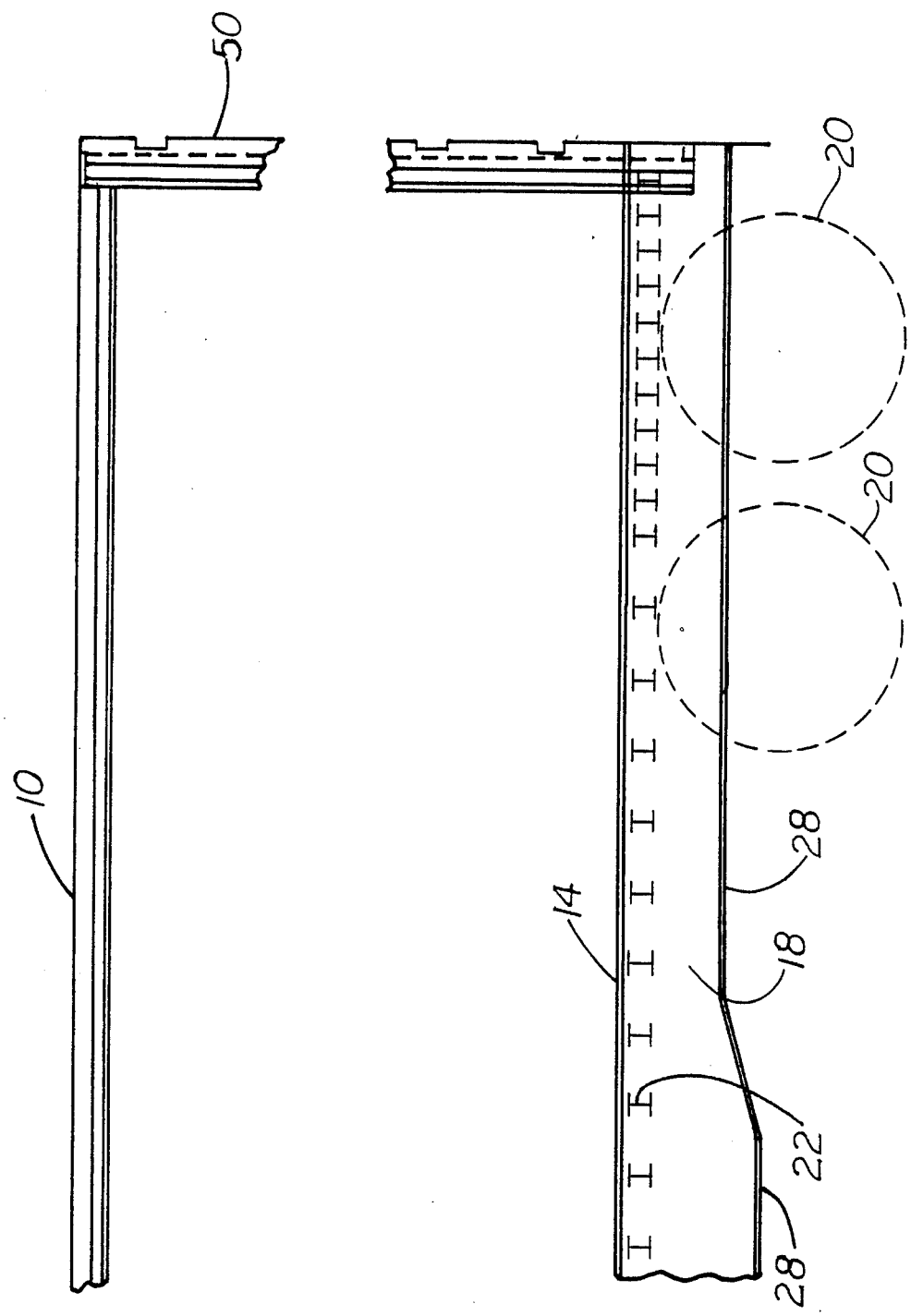
FIG. 2 is a schematic partial cutaway side view of the rearward portion of the semi-truck trailer.
Figure 3:
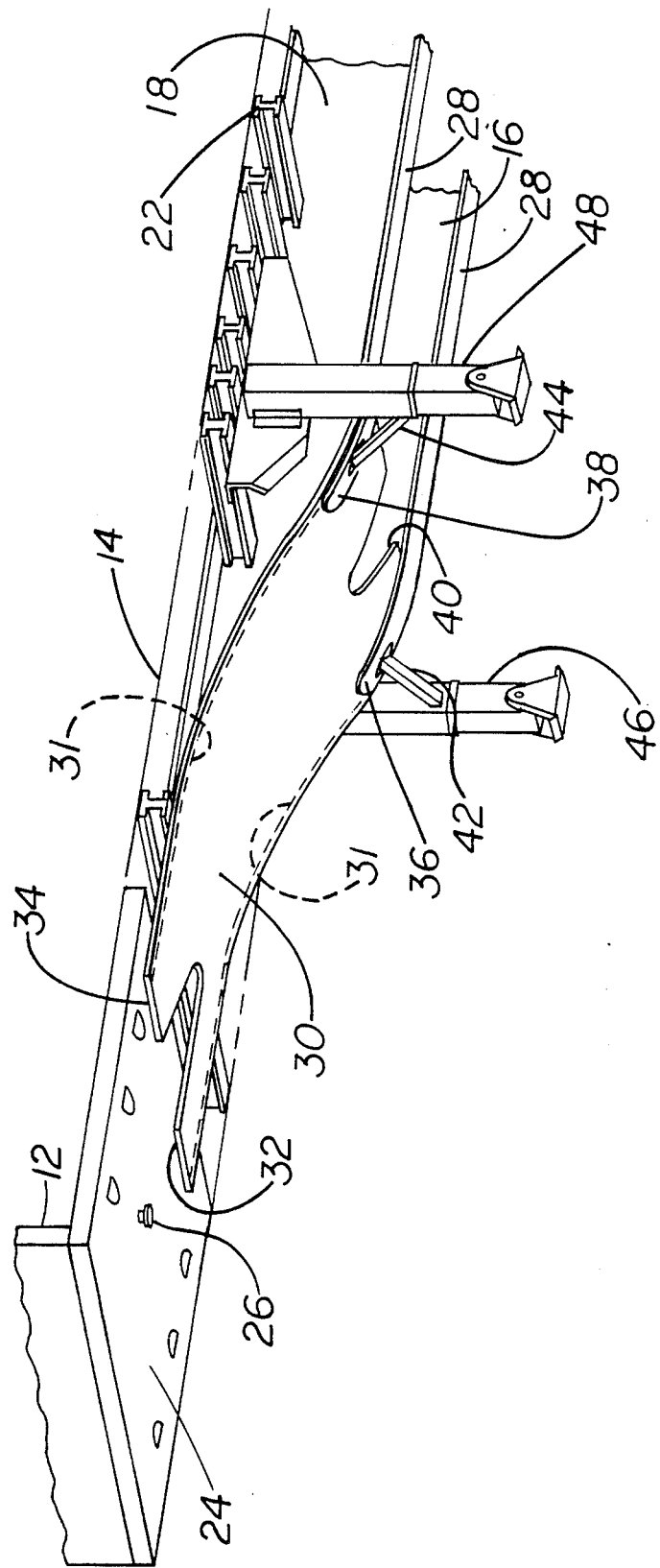
FIG. 3 is a partial cutaway perspective view of the gooseneck underside portion of the semi-truck trailer.

Illustrated schematically in FIGS. 1, 2 and 3 is an open side semi-truck trailer having a roof 10 and front wall 12. The trailer has a flat stepless floor 14 constructed of steel supported wood. Extending substantially the length of the trailer are a pair of welded steel girders 16 and 18. With the exception of the gooseneck forward portion of the trailer the girders 16 and 18 are each of I-section construction. Toward the trailer rear the tandem wheels 20 are indicated in dotted outline. A plurality of steel transverse I-beams 22 are welded to the girders 16 and 18 to support the floor 14. The I-beams 22 extend to the sides of the trailer and between the girders 16 and 18.

At the forward end of the trailer a monocoque under plate 24 and beam assembly extends the entire width of the trailer supporting the front wall 12 and the king pin 26. In the preferred construction the depth of the monocoque assembly is approximately five inches. Depending on the length of the trailer the girders 16 and 18 may have a maximum web depth of twelve to eighteen inches between the gooseneck and the rear tandem. Although a level deck trailer is shown the invention below is also applicable to a drop deck trailer.

The girders 16 and 18 include welded bottom flanges. The bottom flanges 28 extend from the trailer rear to just behind the gooseneck. Extending between the monocoque under plate 24 and both bottom flanges 28 is a single curved plate 30 as best shown in FIG. 3. The single curved plate 30 extends transversely between and beyond both girders 16 and 18 to form the bottom flange of both girders and the underside of the gooseneck. The curved plate 30 is overlapped and welded at 32 and 34 to the under plate 24. In turn the forward ends 36 and 38 of the bottom flanges 26 and 28 are overlapped and welded to the curved plate 30. The curved plate 30 is also welded longitudinally 31 to each web of the girders 16 and 18 between the monocoque under plate 24 and the rear edge 40 of the curved plate 30.

Welded to the bottom flange forward ends 36 and 38 are brackets 42 and 44 respectively. The brackets 42 and 44 in turn extend to telescopeable trailer supports 46 and 48 respectively.

In a preferred embodiment the curved plate is 95 inches long and extends transversely the full width from the outside edges of the bottom flanges 26 and 28 with a 5/16 inch thickness of steel. The curved plate 30 construction provides exceptional strength and torque resistance permitting the gooseneck and monocoque thickness or depth to be reduced to about five and ¼ inches. The construction permits the interior load carrying trailer height to be increased two or more inches from conventional trailer constructions. For an eight by forty-eight foot trailer an additional sixty-four cubic feet of cargo space is provided. Despite the thin section of the curved plate 30 exceptional strength and moment of inertia is provided to the girders 16 and 18.

At the rear of the trailer are a pair of hinge posts 50 supporting the roof 10 and a pair of conventional hinged rear doors. The sides of the trailer are covered with vinyl curtains that are drawn to the front to fully open the trailer sides. Depending on the length and use of the trailer removable intermediate side posts (not shown) may also be included to support the roof 10.

Figure 4:
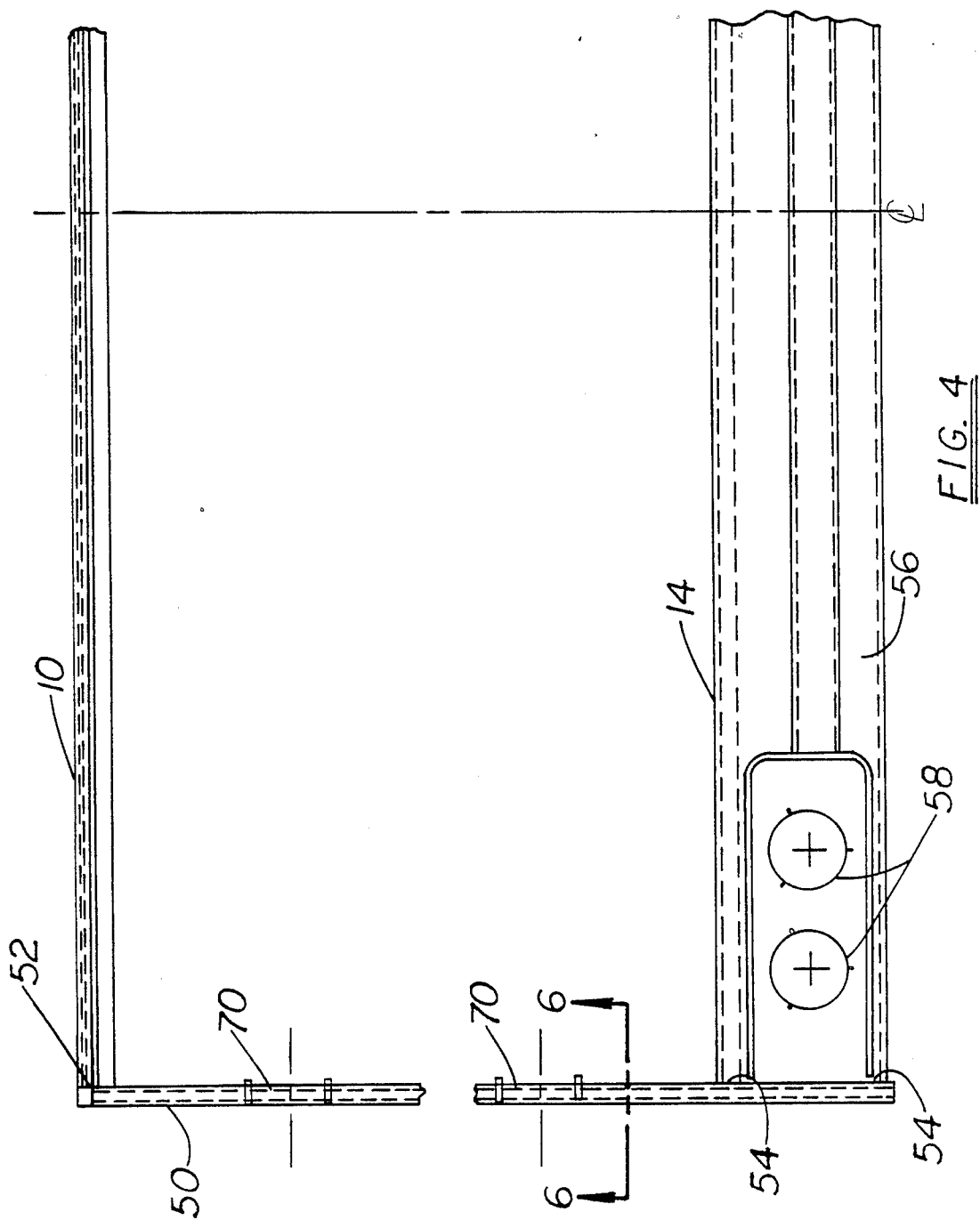
FIG. 4 is a schematic partial cutaway rear view of the semi-truck trailer.
Figure 6:
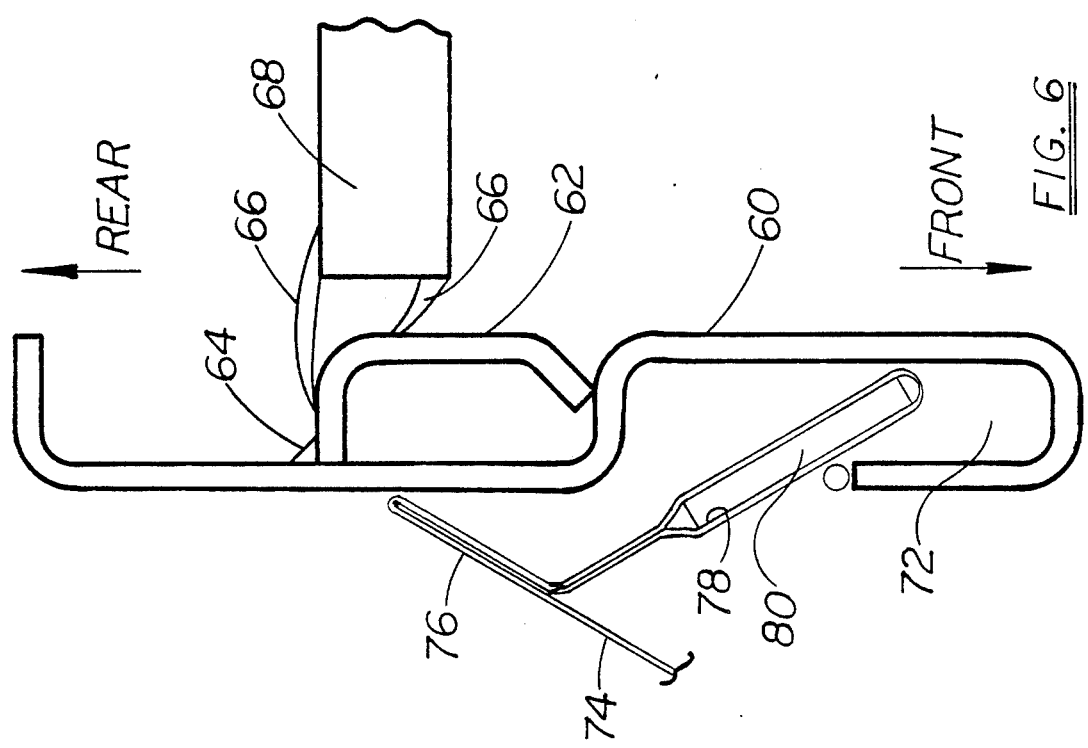
FIG. 6 is a cross-section of the left rear hinge post taken along the line 6—6 of FIG. 4 and FIG. 5.
Figure 5:
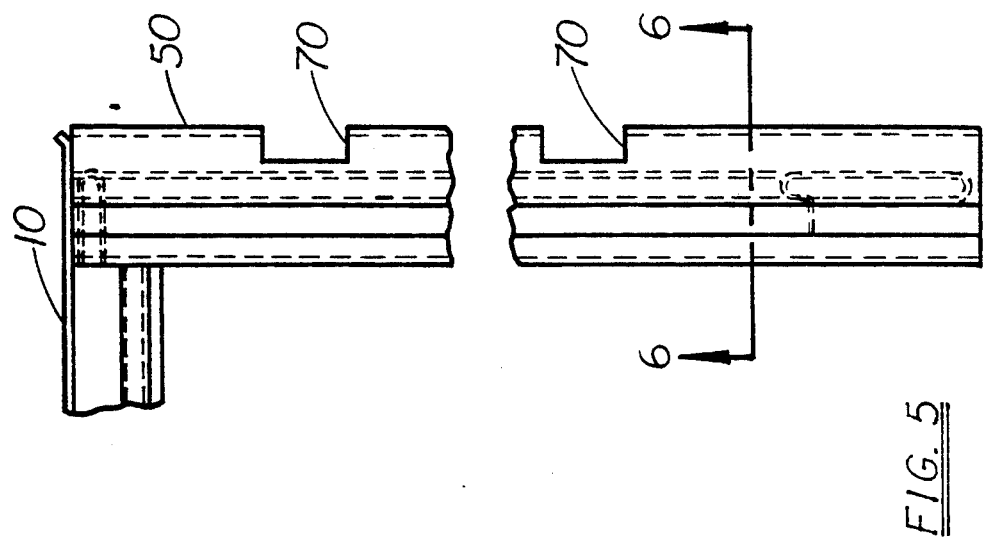
FIG. 5 is an enlarged cutaway side view of the left rear hinge post.

The left rear corner post 50 is shown in greater detail in FIGS. 4, 5 and 6. In FIG. 4 the rear opening of the trailer body is illustrated without the rear doors. The corner post 50 is welded at 52 to the roof 10 and at 54 to the floor frame rear cross member 56. The rear cross member 56 also includes openings for the trailer tail and stop lights 58.

The corner post 50 is constructed of two rolled and formed sections 60 and 62 welded together at 64 as best illustrated in FIG. 6. L-shaped section 62 provides added lateral rigidity to the corner post 50 by forming a vertical structural hollow tube with the rearward cavity of section 60 and a seal contact for the door seals 66 of the rear door 68. Hinge cuts 70 are formed in the corner post at suitable vertical locations as shown in FIGS. 4 and 5.

S-shaped section 60 is formed with a forward cavity or pocket 72 extending the vertical height of the corner post 50. As installed the pocket 72 is toward the front of the trailer and provides a receptacle opening to the outside of the trailer for attachment of the trailer side curtain 74 when closed. As shown in FIG. 6, the curtain 74 is folded back at 76 and formed with a second pocket 78 extending the height of the curtain. Within the curtain pocket 78 is a substantially rigid metal bar 80.

When the curtain 74 is fully drawn closed the pocket 78 and bar 80 are slipped into the vertical pocket 72 whereupon the curtain is drawn to the front of the trailer thereby tightening the curtain longitudinally the full length of the trailer.

In the preferred embodiment, the corner post 50 is one inch in thickness, an exceptionally thin post in comparison with conventional construction of two or more inches in thickness. The result is wider opening rear doors for the trailer.

Although very suitable for general cargo, the trailer improvements above noted are particularly suitable for trans-shipment of parts and subassemblies on pallets for the automobile manufacturing industry. The rear doors provide for conventional loading and unloading of general cargo from conventional loading docks. The side curtains provide for much quicker loading of palletized cargo by conventional or robot fork lift trucks. The latter is particularly important to "just-in-time" supply of parts and subassemblies.

We claim:

1. In an automotive truck trailer, a gooseneck assembly comprising two parallel spaced apart longitudinal main frame members generally spaced toward each side of the trailer, each of said frame members having a vertical web and an upper flange, said vertical web smoothly decreasing in vertical height back to front along at least a substantial portion of the gooseneck assembly, and a single curving lower flange extending between and joining together the two vertical webs of the two main frame members beneath the smoothly decreasing vertical web portions of the gooseneck assembly, the upper surface of said single curving lower flange abutting the two vertical webs.

2. The truck trailer gooseneck assembly of claim 1 including a monocoque box section structure at the front of the gooseneck assembly, said single lower flange at its forward end being joined to the box section.

3. The truck trailer gooseneck assembly of claim 1 including separate lower flanges on each of the main frame members rearward of the gooseneck assembly, said single lower flange at its rearward end being joined to each of the separate lower flanges.

4. The truck trailer gooseneck assembly of claim 1 including a monocoque box section structure having an under plate at the front of the gooseneck assembly and substantially five and ¼ inches in depth, said single curving lower flange at its forward end being joined to the box section under plate.

5. The truck trailer gooseneck assembly of claim 1 including a separate lower flange on each of the main frame members rearward of the gooseneck assembly, said separate lower flanges at their respective forward ends being wrapped over the single lower flange and joined thereto.

6. In an automotive truck trailer a gooseneck assembly comprising two parallel spaced apart longitudinal main frame members generally spaced toward each side of the trailer, each of said frame members having a vertical web and an upper flange, said vertical web smoothly decreasing in vertical height back to front along at least a substantial portion of the gooseneck assembly, a single curving lower flange extending between and joining together the two vertical webs of the main frame members beneath the smoothly decreasing vertical web portions of the gooseneck assembly, the upper surface of said single curving lower flange abutting the two vertical webs, a structure at the front of the gooseneck assembly to retain a trailer king pin, said single curving lower flange at its forward end being joined to the structure at the front end, separate lower flanges on each of the main frame members rearward of the gooseneck assembly, said separate lower flanges at their respective forward ends being joined to the single lower flange.

7. The truck trailer of claim 6 wherein the structure at the front of the gooseneck assembly comprises a monocoque box section having an under plate, said single lower flange being joined to the under plate.

8. The truck trailer of claim 7 wherein the gooseneck assembly decreases to substantially five and ¼ inches in joining to the monocoque box section structure.

9. The truck trailer of claim 6 wherein the separate lower flanges at their respective forward ends partially cover from underneath the single lower flange.

10. A free standing truck trailer rear corner post comprising a substantially S-shaped cross-section forming a pair of cavities and a substantially L-shaped cross-section joined to the S-shaped section substantially within at least a portion of one of the pair of cavities of the S-shape, the other cavity of the S-shape opening to the outside of the trailer and being formed to provide a pocket for a member receivable therein, said pocket configured to trap said member therein upon horizontal tensioning of a side curtain attached to said member.

11. The truck trailer rear corner post of claim 10 wherein the cavity containing the L-shaped section is rearward relative to the trailer and the L-shaped section forms a jamb for rear door seals.

12. The truck trailer rear corner post of claim 10 wherein the cavity of the S-shaped cross-section forming a receiving pocket is forward relative to the trailer and the S-shape wraps over to partially enclose the open side of the cavity and form the pocket.

13. The truck trailer rear corner post of claim 10 wherein the transverse thickness of the post is substantially one inch, the L-shaped cross-section in one cavity of the S-shaped cross-section forming a vertical structural hollow tube with the S-shaped section.

14. A free standing truck trailer rear corner post comprising a substantially S-shaped cross-section forming a pair of cavities and a substantially L-shaped cross-section joined to the S-shaped cross-section substantially within at least a portion of one of the pair of cavities of the S-shape to form a vertical structural hollow tube with the S-shaped cross-section, said combination of S-shaped and L-shaped cross-sections being substantially one inch in transverse thickness, and the other cavity of the S-shaped opening to the outside of the trailer and being formed to provide a pocket for a member receivable therein, said pocket configured to trap said member therein upon horizontal tensioning of a side curtain attached to said member.

15. The truck trailer rear corner post of claim 14 wherein the cavity containing the L-shaped section is rearward relative to the trailer and the cavity forming a receiving pocket is forward relative to the trailer.

16. The truck trailer rear corner post of claim 15 wherein the L-shaped section forms a jamb for rear door seals and the forward cavity S-shape wraps over to partially enclose the open side of the cavity and form the pocket.

17. In a curtain side truck trailer, a gooseneck assembly comprising parallel spaced apart longitudinal main frame members, each of said frame members having a vertical web and an upper flange, said vertical web decreasing smoothly in vertical height back to front along at least a substantial portion of the gooseneck assembly,
- a single curving lower flange extending between and joining together at least two of the vertical webs of the main frame members beneath the smoothly decreasing portions of the vertical webs,
- a structure at the front of the gooseneck assembly to retain a trailer king pin, said single lower flange at its forward end being joined to the structure at the front end,
- separate lower flanges on each of the main frame members rearward of the gooseneck assembly, said separate lower flanges at their respective forward ends being joined to the single lower flange,
- a plurality of transverse floor beams including a rear most beam and a pair of free standing rear corner posts mounted on said rear most beam,
- each of said rear corner posts comprising a substantially S-shaped cross-section forming a pair of cavities and a substantially L-shaped cross-section joined to the S-shaped cross-section substantially within at least a portion of one of the pair of cavities of the S-shape to form a vertical structural hollow tube with the S-shaped cross-section and the other cavity of the S-shape being formed to provide a pocket for receiving and attaching the end of the trailer curtain at the side of the corner post.

* * * * *